United States Patent [19]
Koizjmi et al.
[11] 3,726,492
[45] Apr. 10, 1973

[54] METHOD AND MEANS FOR METERING TAPE FOOTAGE

[75] Inventors: Sumio Koizjmi, Kawasaki-shi; Hiroyuki Adachi, Sagamihara-shi, both of Japan

[73] Assignee: Shinmei Electric Co. Ltd., Kanagawa-ken, Japan

[22] Filed: Mar. 4, 1971

[21] Appl. No.: 120,860

[30] Foreign Application Priority Data

Mar. 7, 1970 Japan ....................45/19053
Apr. 25, 1970 Japan ....................45/35122

[52] U.S. Cl. ....................242/201, 33/129, 242/206, 352/172
[51] Int. Cl. ....................B11b 15/32, G03b 1/04
[58] Field of Search ....................242/201–204; 33/137–140; 352/172; 235/92 R, 92 ME, 92 MS, 92 SA; 179/100.2 R, 100.2 S, 100.2 Z

[56] References Cited

UNITED STATES PATENTS 3,564,216 2/1971 Laycak ....................235/92
2,756,279 7/1956 Lang ....................179/100.2
2,944,750 7/1960 Hall, Jr. ....................242/206
3,384,968 5/1968 Fukatsu ....................33/129

*Primary Examiner*—Leonard D. Christian
*Attorney*—Irving M. Weiner

[57] ABSTRACT

The running length of magnetic tape being fed from a supply reel to a takeup reel on a tape recorder is metered by first reducing the variable revolving speed of the takeup reel in a predetermined ratio, adding the reduced revolving speed of the takeup reel to the variable revolving speed of the supply reel, and converting the resultantly obtained sum into a desired unit of indication. This metering method finds application in several devices also disclosed herein, in which are commonly employed planet differential means in association with both of a pair of revolvable shafts on which are respectively mounted the supply and takeup reels. The planet differential means include a pair of planet gears whose revolution around a common axis, corresponding to the aforementioned sum, is conveyed to a digital tape footage counter or other indicating means.

13 Claims, 6 Drawing Figures

INVENTOR.
SUMIO KOIZUMI
HIROYUKI ADACHI
BY Irving M. Weiner
ATTORNEY

METHOD AND MEANS FOR METERING TAPE FOOTAGE

This invention relates generally to the metering of tape footage, and more specifically to a new and better method and means for metering the footage of magnetic tape on the so-called "tape recorders," "tape players" and other devices making use of magnetic tape in a comparable manner (hereinafter simply referred to as "tape recorders" to mean all such devices to which is applicable the present invention). The invention has particular utility in accurately detecting and indicating a recorded point or portion of the magnetic tape on the tape recorders, which may be of either tape magazine or open reel type with substantially the same maximum tape winding diameters on both revolvable shafts.

The so-called tape footage counter has been known which, in fact, meters and indicates the revolutions of a supply or takeup reel in a predetermined ratio of speed reduction. Since such a tape counter is driven by only one revolving shaft on either the tape supply or takeup side, it is bound to make indications without almost any relation to actual tape footage or to the lapse of time because of variation of the revolving speed of that shaft along with gradual change in the diameters of the tape windings on the supply and takeup reels. For this reason, a particular recorded point on magnetic tape as indicated by a counter on one tape recorder cannot necessarily be detected with any accuracy by a counter on another. Indeed, it may be asserted that the prior art tape counters have been merely a rough indicator of reel revolutions.

It is accordingly an important object of the present invention to provide an improved method and means for accurately metering the mean revolutions of supply and takeup reels on a tape recorder and making indication in terms of time or the running length of magnetic tape thereon.

Another object of the invention is to provide a method and means for metering with equal accuracy the running length of magnetic tape on almost any type of tape recorder, so that a particular recorded portion of the magnetic tape as indicated by the means of the invention on one tape recorder can be exactly detected and reproduced on another.

Yet another object of the invention is to provide a method and means for metering the running length of magnetic tape on a tape recorder, wherein the great discrepancies between the running length of the magnetic tape and the revolving speeds of the supply and takeup reels that occur especially at the start and end of a record or playback operation are successfully compensated for.

Still another object of the invention is to provide means for metering the running length of magnetic tape on a tape recorder, wherein a planet differential is employed to adequately combine the revolutions of a pair of revolable shafts on tape supply and takeup sides, thereby to compensate for the great discrepancies between the running length of the magnetic tape and the revolving speeds of these shafts that occur especially at the start and end of a record or playback operation.

Still a further object of the invention is to provide means for metering the running length of magnetic tape on a tape recorder which may be either built directly in the cabinet of the tape recorder or formed as an integral unit or as part of a lid to be closed on a tape magazine mounted in place upon the cabinet. The means of the invention may prove to be of particular advantage when formed separately from the cabinet of a magazine type tape recorder thereby to meet today's demand for minimuarization of tape recorders.

A further object of the invention is to provide means for metering the running length of magnetic tape on a tape recorder so made that the tape which has been wound from a supply reel onto a takeup reel in a record or playback operation is rewound back to the supply reel without suffering either any undue stretch, breakage or spillage since then the respective reels are made to revolve at speeds in accordance with gradual change in the diameters of the magnetic tape wound thereon.

With these objects in view and the other objects hereinafter set forth, the present invention will now be described in more specific aspects thereon in connection with the attached drawings, which, however, are meant only to illustrate and not to impose restrictions on the invention, and in which.

Figure 1:
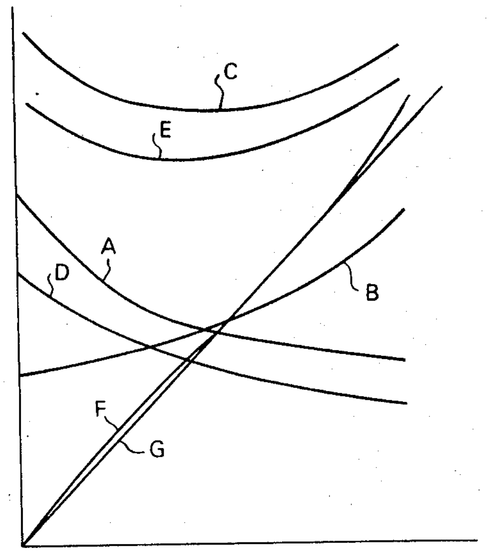
FIG. 1 is a graphic representation of the differentiated as well as integrated revolving speeds of tape reels on a tape recorder.

Referring to the drawings, and first of all to FIG. 1 in order to describe the tape footage metering method of the present invention, the axis of abscissas in the graph represents time whereas the axis of ordinates represents the revolving speed of tape reels as well as the running length of magnetic tape thereon. The reference characters A and B indicate differential curves of the revolving speed of a takeup reel and a supply reel, respectively. These curves are far from being straight. The curve C, representing the sum of the curves A and B, is closer to a straight line but still exhibit discrepancies that cannot be neglected in actual metering of tape footage. A small metering error at the end of tape feed in a record or playback operation causes no practical problem and hence may be overlooked, but that at the start of the tape feed should be avoided as far as possible.

According to the present invention such metering error especially at the start of tape feed in a record or playback operation is successfully eliminated as follows: The revolving speed of the takeup reel (represented by the curve A), which is fastest at the start of tape feed, is reduced in a predetermined ratio as indicated by the curve D. This reduced revolving speed of the takeup reel is combined with the revolving speed of the supply reel (represented by the curve B) into the curve E. The integral curve thereof, indicated by F, shows close approximation to the ideal straight line G.

Hence the speed of revolution of the takeup reel is reduced in a predetermined ratio and is then added with the revolving speed of the supply reel. By adequately converting this sum of the revolving speeds into time or the running length of the magnetic tape, about 95 per cent of the indication can be regarded as being linear for all practical purposes when the ratio of the minimum tape winding diameter to the maximum on the reels is no more apart than about 1:2.5.

Figure 2:
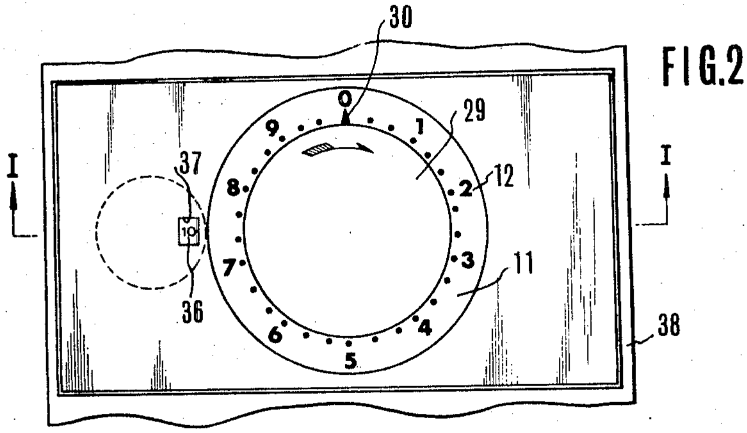
FIG. 2 is a top view of a preferred embodiment of the present invention.
Figure 3:
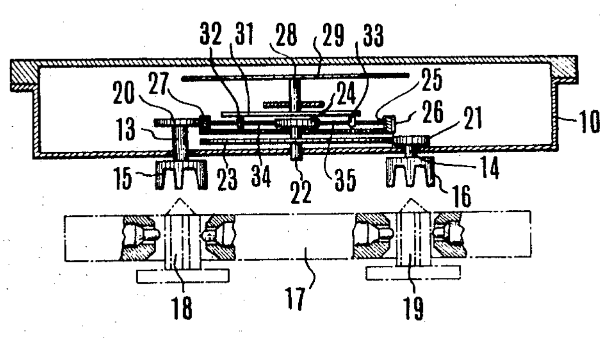
FIG. 3 is a vertical sectional view taken along the plane of line I — I in FIG. 2, in which is shown the metering means of the invention in combination with a tape magazine mounted on a pair of revolvable shafts of a tape recorder.
Figure 4:
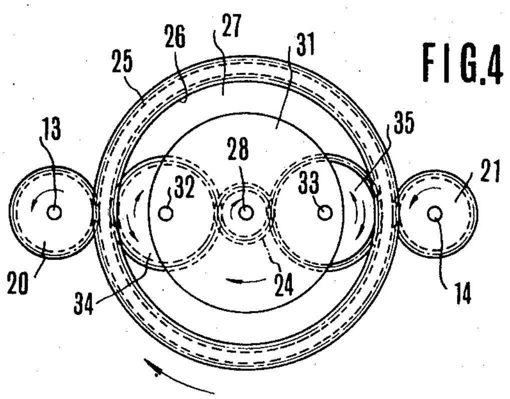
FIG. 4 is an explanatory top view of a planet differential as employed in the embodiment of FIGS. 2 and 3.

Proceeding now to the description of some preferred embodiments of the present invention in conformity with the above described method, the embodiment illustrated in FIGS. 2 through 4 of the drawings may be either formed as an integral unit or fixedly attached to a lid which is usually openably hinged to a cabinet of a record player. The various working mechanisms of this embodiment are housed within a casing 10 which, as before mentioned, may or may not be fixedly attached to a lid of a record player. On the upper surface of this casing 10 there is formed an annular window 11 closed with some transparent material on which is printed or otherwise marked a graduated scale 12.

As illustrated in FIG. 3, a pair of input shafts 13 and 14 extends vertically through the bottom of the casing 10 and have joints 15 and 16 formed integrally therewith for engagement with revolvable shafts 18 and 19, respectively, of the tape recorder on which is mounted a tape magazine 17. These input shafts 13 and 14 have different axial lengths and are fixedly provided with pinions 20 and 21 at their upper ends. The pinion 21 of the input shaft 14 is in mesh with a gear 23 which is integral with a center shaft 22 of the casing 10. Above this gear 23 a sun gear 24 is pressed or otherwise attached onto the upper end of the same center shaft 22 whose height reaches approximately the middle of the casing 10. Between the gear 23 and the sun gear 24 there is further loosely provided a crown gear 27 whose inner and outer circumferential surfaces have their respective sets of teeth 25 and 26, the external teeth 26 of this crown gear 27 being in mesh with the aforesaid pinion 20 of the input shaft 13.

Immediately above the sun gear 24 there is provided another shaft 28 coaxially with the aforesaid center shaft 22 and with a certain spacing between their opposed ends. An indicating disk 29 having an index 30 marked thereupon (refer to FIG. 2) is mounted on the upper end of the shaft 28 so as to be visible through the aforesaid window 11 on the upper surface of the casing 10. At the lower end of the shaft 28, on the other hand, there is fixedly provided a supporting disk 31 having a pair of downwardly projecting shafts 32 and 33 at diametrically opposite positions. A pair of planet gears 34 and 35 are respectively provided at the lower ends of these shafts 32 and 33 so as to be both in mesh with the sun gear 24 and the internal teeth 25 of the crown gear 27.

The device for metering the running length of magnetic tape constructed substantially as described in the preceding three paragraphs, being formed as an integral unit or as a part of the lid of the tape recorder also as mentioned already, is to be engaged with the revolvable shafts 18 and 19 extending through the tape magazine 17 by means of the joints 15 and 16 of its input shafts 13 and 14, respectively. As the magnetic tape within the magazine 17 is fed at a constant speed, the speeds of revolution of the shafts 18 and 19 vary in a certain prescribed relationship depending upon gradual variation of the diameters of the tape windings on these shafts 18 and 19. These varying speeds of revolution of the shafts 18 and 19 are converted into a substantially constant one by means of the above described planet differential before being transmitted to the shaft 28 and hence to the indicating disk 29, thereby causing its index 30 to move at the substantially constant speed along the scale 12 of the annular window 11.

The rotations of the shafts 18 and 19 in the same direction are transmitted via the input shafts 13 and 14 and the pinions 20 and 21 to the crown gear 27 and the gear 23, respectively, which then are made to rotate in the same direction along with the sun gear 24. Thereupon, as seen most clearly in FIG. 4, the planet gears 34 and 35 which are both in mesh with the sun gear 24 and the internal teeth 25 of the crown gear 27 revolve around the center shaft 22 in the same direction as the sun gear 24 and the crown gear 24, thereby to rotate the supporting disk 31, while themselves rotating on their own axes. The resultant rotation of the supporting disk 31 and hence of the shaft 28 is determined in part by the relative numbers of teeth provided to the inner circumferential surface of the crown gear 27 and to the sun gear 24, and the rotations of the planet gears 34 and 35 are defined in part by a difference between the speeds of revolution of the gear 23 and the crown gear 27. Hence the varying speeds of revolution of the shafts 18 and 19 are converted into a substantially constant one as it is transmitted to the supporting disk 31 via the shafts 32 and 33 of the planet gears 34 and 35.

What may be termed a "tape timer" is realized by designing the relative numbers of teeth of the various intermeshing gears in such a manner that the scale 12 indicates recording (or playback) time in connection with tape footage. In this particular embodiment of the invention, one complete turn of the index 30 along the scale 12 is made to correspond to ten minutes, as may be seen from FIG. 2. Two-figure numbers 10, 20, 30 and so forth, printed or otherwise marked on a dial 36 so as to be visible through another window 37 on the upper surface of the casing 10, may be fed one by one by means of adequate reduction gearing upon each complete turn of the indicating disk 29.

Figure 5:
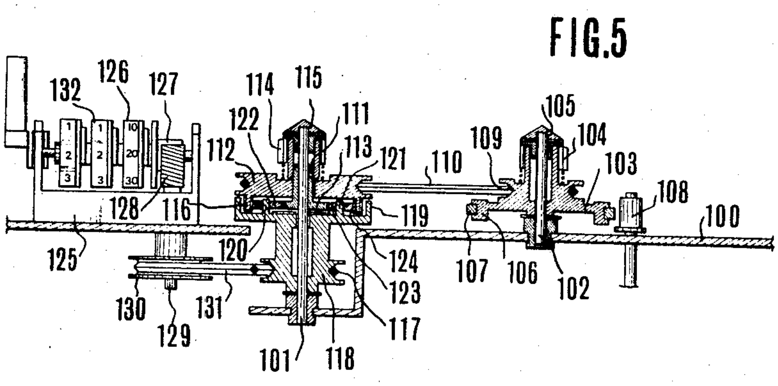
FIG. 5 is a vertical sectional view of another preferred embodiment of the present invention.
Figure 6:
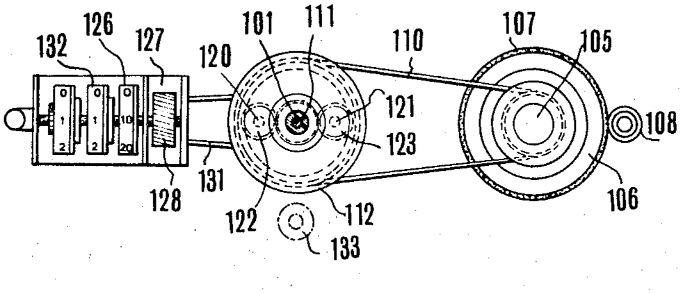
FIG. 6 is an explanatory top view of a planet differential, etc., as employed in the embodiment of FIG. 5.

FIGS. 5 and 6 illustrate another preferred embodiment of the present invention, which can be built directly in tape recorders of either magazine or open reel type as desired. The reference numerals 101 and 102 in FIG. 5 indicate a pair of shafts fixedly planted upon a frame of a record player. This fixed shaft 102 is encased within a revolvable hollow shaft 103 having a means 104 for engagement with a tape reel (not shown). The tape reel so mounted on the hollow shaft 103 is to be retained in place by means of a cap 105 provided at the top of the shaft 102. This hollow shaft 103, formed in steps as seen in FIG. 5, includes a large diameter portion 106 whose rim has a tire 107 of necessary for the rewinding operation. As this tape rewinding operation proceeds, the speed of revolution of the hollow shaft 111 on the tape takeup side decreases in inverse proportion to the revolving speed of the hollow shaft 103 on the tape supply side. Thus, due to the well designed setup of the planet gears 122 and 123, the sun gear 113 and the crown gear 116, no undue tension is exerted to the magnetic tape in its rewinding operation.

It is also to be well noted that no especial braking system need be provided for the revolvable hollow shafts 103 and 111 in this embodiment of the invention. Since the revolvable hollow shaft 118 on the lower portion of the fixed shaft 101 is coupled via the belt 131 to the pulley 130 adapted for driving the counter 125, the revolution of the hollow shaft 118 is rapidly dampted by the load supplied from the counter mechanism upon cessation of its power transmission to the hollow shaft 103 via the planet differential. Hence the application of a braking force to only one of the revolvable shafts, as has been encountered heretofore, is successfully prevented, resulting in the elimination of practically any possibility of tape stretch, breakage or spillage.

It will be obvious that the indicating means considered in the foregoing embodiments of the present invention illustrated in FIGS. 2 through 6 of the drawings may be made to indicate the running length of magnetic tape in terms of percentage, time or any other unit and in either digital or "analog" form. Further, the application of the invention is not limited to tape recorders and players considered above but include the so-called video tape recorders and other systems making use of magnetic tape in a similar manner. All such modifications or changes within the skill of those in the art are intended in the foregoing disclosure; therefore, it is appropriate that the appended claims be construed broadly and in a manner consistent with the spirit and scope of the invention herein.

What is claimed is:

1. A method of metering the running length of tape which is fed at a constant speed from a first revolvable shaft on which it has been wound to a second revolvable shaft of substantially the same diameter as said first revolvable shaft, which comprises reducing a revolving speed of said second revolvable shaft according to a predetermined ratio, adding the reduced revolving speed of said second revolvable shaft to a revolving speed of said first revolvable shaft, and converting the resultantly obtained sum into a desired unit of indication.

2. In a tape recorder of magazine type comprising a cabinet, a first revolvable shaft adapted for the supply of magnetic tape within a magazine and a second revolvable shaft adapted for the takeup of the magnetic tape supplied by said first revolvable shaft; a device for metering the running length of the magnetic tape comprising a casing, planet differential means housed in said casing and associated with both of said first and said second revolvable shafts, said planet differential means being adapted for converting the variable speeds of revolution of said first and said second revolvable shafts into a substantially constant one, and means also provided to said casing for indicating the substantially constant speed in terms of a desired unit.

3. The device as claimed in claim 2 in which said casing is formed as a part of a lid openably provided on the top of said cabinet.

4. The device as claimed in claim 2 in which said casing is formed as a separable unit.

5. The device as claimed in claim 2 in which said planet differential means comprise a pair of input shafts projecting downwardly from the bottom of said casing so as to be coupled respectively to said first and said second revolvable shafts, said input shafts having pinions at their ends inside of said casing, a gear fixedly mounted on a center shaft of said casing so as to be in mesh with one of said pinions, a crown gear loosely mounted on said center shaft and having external teeth in mesh with the other of said pinions, a sun gear provided at the upper end of said center shaft, and a pair of planet gears both in mesh with said sun gear and internal teeth of said crown gear, the revolution of said planet gears around said center shaft being conveyed to a shaft provided coaxially above said center shaft for driving said indicating means.

6. The device as claimed in claim 5 in which the gear ratio of said gear and one of said pinions in mesh therewith and the gear ratio of said crown gear and the other of said pinions in mesh therewith are made different relative each other thereby to reduce the revolving speeds of said first and said second revolvable shafts in a predetermined ratio.

7. In a tape recorder of open reel type comprising a cabinet, a first revolvable shaft adapted for the supply of magnetic tape wound on a reel mounted thereon and a second revolvable shaft adapted for the takeup of the magnetic tape onto another reel mounted thereon; a device for metering the running length of the magnetic tape comprising planet differential means associated with both of said first and said second revolvable shafts, said planet differential means being adapted for converting the varying speeds of revolution of said first and said second revolvable shafts into a substantially constant one, and means for indicating the substantially constant speed in terms of a desired unit.

8. The device as claimed in claim 7 in which said planet differential means are provided directly to said first revolvable shaft.

9. The device as claimed in claim 8 in which said planet differential means comprise a third revolvable shaft provided coaxially below said first revolvable shaft and associated with said indicating means, a sun gear provided at the lower end of said first revolvable shaft, an internally toothed crown gear provided coaxially with said sun gear and driven from said second revolvable shaft, and a pair of planet gears both in mesh with said sun gear and said crown gear, the revolution of said planet gears around the axis of said first revolvable shaft being conveyed directly to said third revolvable shaft.

10. The device as claimed in claim 9 in which said internally toothed crown gear is formed at the bottom of a pulley loosely mounted on said first revolvable shaft.

11. The device as claimed in claim 9 in which the relative numbers of teeth provided to said sun gear and to said crown gear are determined so as to reduce the revolving speeds of said first and said second revolvable shafts in a predetermined ratio.

rubber or other suitable material. Adjacently there is provided a pressure roller 108 driven from a motor (not shown). This pressure roller 108 is to come in contact with the tire 107 of the aforesaid large diameter portion 106 for driving the hollow shaft 103. Since the magnetic tape is to be fed at a constant speed, the speed of revolution of the hollow shaft 103 has to be varied in accordance with gradual change in the diameter of the magnetic tape wound on the reel to be mounted thereon. For this purpose the pressure roller 108 is made to run so as to insure such desired variation of the revolving speed of the hollow shaft 103 by conventionally available means (not shown) well known in the art.

A pulley 109 is formed above the large diameter portion 106 of the hollow shaft 103 on the tape takeup side, and a belt 110 extends between this pulley 109 and another pulley 112 around a revolvable hollow shaft 111 encasing the other 101 of the aforementioned pair of fixed shafts. Like the above described fixed shaft 102, this shaft 101 also has a reel cap 115 at its top and is encased in the revolvable hollow shaft 111 having a sun gear 113 at its lower end and a means 114 for engagement with a tape reel (not shown). At the bottom of the aforesaid pulley 112 loosely mounted on the hollow shaft 111 there is formed a substantial crown gear 111 which is toothed only on its inner surface. A lower portion of the fixed shaft 101 is encased in another revolvable hollow shaft 118 having a pulley 117 near its lower end. The top of this hollow shaft 118 expands into a flange 119 which may have an upwardly projecting rim and which is in face to face relationship with the bottom of the pulley 112. A pair of shafts 120 and 121 are planted at the diametrically opposite positions on the top of the flange 119 and are turnably mounted with planet gears 122 and 123, respectively, which are both in mesh with the aforesaid sun gear 113 and the internal teeth 124 of the crown gear 116 at the bottom of the pulley 112.

The pulley 117 that is integral with the hollow shaft 118 is associated with a digital counter 125 mounted upon the frame 100 and which, in itself, belongs to the prior art. A shaft 129 of a worm 128 meshing with a worm wheel 127 adapted for the direct drive of a dial 126 carrying the least significant digits of the counter 125 on its periphery extends through the frame 100 and is provided with a pulley 130 at its lower end. This pulley 130 is interlocked with the pulley 117 of the hollow shaft 118 by means of a belt 131.

The hollow shaft 103 on the tape takeup side rotates due to frictional contact between the tire 107 of its large diameter portion 106 and the motor driven pressure roller 108. This rotation of the hollow shaft 103 is conveyed via the belt 110 to the pulley 112, which then rotates the crown gear 116 formed integrally therewith. On the other hand, the hollow shaft 111 on this tape supply side is rotated together with the sun gear 113 by the winding operation of the magnetic tape (not shown) from its supply reel on the hollow shaft 111 to its takeup reel on the other hollow shaft 103. Hence the planet gears 122 and 123, both in mesh with the sun gear 113 and the internal teeth 124 of the crown gear 116, are made to revolve on their own axes and around the fixed shaft 101, thereby causing the hollow shaft 118 to revolve on the same fixed shaft 101. This revolution of the hollow shaft 118 is transmitted via the belt 131 to the input shaft 129 of the counter 125 to drive the same.

By adequately designing the relative numbers of teeth of the various intermeshing gears, one complete turn of the dial 126 having the least significant digits marked on its periphery can be made to correspond to 1 minute. Further, with each of the graduations on the periphery of this dial 126 made to represent 10 seconds, for example, the next dial 132 may be caused to turn by one graduation upon each complete turn of the dial 126. With such slight modifications the illustrated digital counter is rendered admirably suitable for use in the present invention. The aforementioned "tape timer" is here again realized by setting the relative numbers of teeth of the related gears in such a manner that the graduations on the dials of this counter indicate recording (or playback) time in relation with tape footage.

As the magnetic tape is fed at a constant speed in a record or playback operation from the supply reel (not shown) on the revolvable hollow shaft 111 to the takeup reel (not shown) on the other revolvable hollow shaft 103, the speeds of revolution of these hollow shafts 111 and 103 are subject to change in a certain prescribed relationship along with gradual variation of the diameters of the tape windings on the respective reels. The revolutions of the hollow shafts 111 and 103 are transmitted to the other hollow shaft 118 with their varying speeds rendered substantially constant by means of the above described planet differential. The revolution of this hollow shaft 118 on the fixed shaft 101 is determined in part by the relative numbers of teeth provided to the sun gear 113 and to the inner surface of the crown gear 116, whereas the rotations of the planet gears 122 and 123 themselves may be defined substantially by difference between the revolving speeds of the crown gear 116 and the sun gear 113. It will be accordingly seen that the revolution thus imparted to the hollow shaft 118 via the shafts 120 and 121 of the planet gears 122 and 123 has a substantially constant speed.

For rewinding the magnetic tape that has been wound onto the takeup reel on the hollow shaft 103 in a record or playback operation as above, the hollow shaft 118 is set in rotation by a drive means 133 (FIG. 6) through an adequate changeover mechanism (not shown) belonging to the prior art, while the hollow shaft 103 on the tape supply side (formerly the takeup side) is adequately applied with a braking force also in accordance with the prior art. The rotation of the hollow shaft 118 is transmitted to the sun gear 113 and the crown gear 116 via the planet gears 122 and 123. The sun gear 113 sets in rotation the revolvable hollow shaft 111 on the tape takeup side (formerly the supply side), whereas the crown gear 116 is made to rotate the pulley 112 and hence the pulley 109 on the tape supply side via the belt 110.

The hollow shaft 111 on the tape takeup side revolves at a faster speed than the hollow shaft 103 on the tape supply side, which is under the application of a braking force as before mentioned, since the diameter of the tape winding on the takeup reel is smaller than that of the tape winding on the supply reel. The hollow shaft 103 thus revolves at no greater speed than that 12. The device as claimed in claim 9, in combination with a tape rewinding device which includes drive means adapted for driving said third revolvable shaft in a tape rewinding direction.

13. In a tape recorder having a first revolvable shaft adapted to supply magnetic tape and a second revolvable shaft adapted to take up the magnetic tape supplied by said first revolvable shaft, a device for metering the running length of the magnetic tape, said device comprising:

means sensing the revolving speed of one of said revolvable shafts and providing an output which is a reduction according to a predetermined ratio of said revolving speed of said one revolvable shaft;

means adding said reduced revolving speed to the revolving speed of the other of said revolvable shafts;

means converting the resultantly obtained sum of said revolving shafts into a desired unit of indication.

* * * * *